United States Patent
Kohn

[11] Patent Number: 5,279,058
[45] Date of Patent: Jan. 18, 1994

[54] PHOSPHORESCENT IDENTIFICATION DEVICE

[75] Inventor: Daniel K. Kohn, 314 Regent Street, London, Ontario, Canada, N6A 2H4

[73] Assignee: Daniel K. Kohn, London, Canada

[21] Appl. No.: 903,288

[22] Filed: Jun. 24, 1992

Related U.S. Application Data

[63] Continuation-in-part of Ser. No. 705,810, May 28, 1991, abandoned.

[51] Int. Cl.⁵ .................................................. G09F 3/10
[52] U.S. Cl. ..................................... 40/638; 427/157; 428/690
[58] Field of Search ............... 40/638, 295, 542; 427/54.1, 157, 158; 428/215, 690, 913

[56] References Cited

U.S. PATENT DOCUMENTS

| Re. 29,334 | 8/1977 | Ryan et al. | 149/18 |
|---|---|---|---|
| 2,213,666 | 9/1940 | Burke | 40/2 |
| 2,262,492 | 11/1941 | Farrell | 40/2 |
| 2,629,956 | 3/1953 | Switzer | 427/157 X |
| 2,650,169 | 8/1953 | Goldstein | 117/33.5 |
| 2,767,495 | 10/1956 | Harris | 40/2 |
| 2,950,222 | 8/1960 | Hinson | 154/120 |
| 2,990,308 | 6/1961 | Goldstein | 154/79 |
| 3,043,710 | 7/1962 | Patten et al. | 428/215 |
| 3,291,668 | 12/1966 | Goldstein | 156/67 |
| 3,767,516 | 10/1973 | Brady | 161/2 |
| 3,767,517 | 10/1973 | Williams | 161/2 |
| 3,873,390 | 3/1975 | Cornell et al. | 156/230 |
| 3,961,112 | 6/1976 | Genevitz et al. | 428/29 |
| 3,978,340 | 8/1976 | Schroeder | 250/462 |
| 4,024,298 | 5/1977 | Mossman | 427/157 X |
| 4,024,404 | 5/1977 | Schroeder | 250/462 |
| 4,035,652 | 7/1977 | Schroeder | 250/462 |
| 4,089,995 | 5/1978 | Ferro et al. | 427/157 |
| 4,211,823 | 7/1980 | Gravisse et al. | 428/263 |
| 4,269,321 | 5/1981 | Ichinose et al. | 215/343 |
| 4,298,650 | 11/1981 | Lu | 427/157 X |
| 4,393,103 | 7/1983 | Louden | 428/514 X |
| 4,546,042 | 10/1985 | Quon | 428/378 |
| 4,627,642 | 12/1986 | Peronneau et al. | 428/690 X |
| 4,663,214 | 5/1987 | Coburn, Jr. | 428/204 |
| 4,677,010 | 6/1987 | Selwyn | 428/40 |
| 4,692,266 | 9/1987 | Costa et al. | 427/157 X |
| 4,695,336 | 9/1987 | Coburn, Jr. | 156/67 |
| 4,769,265 | 9/1988 | Coburn, Jr. | 428/690 X |
| 4,928,212 | 5/1990 | Benavides | 428/690 X |
| 5,024,898 | 6/1991 | Pitts et al. | 428/511 |
| 5,040,296 | 8/1991 | Yerger | 30/81 |
| 5,043,265 | 8/1991 | Tanke et al. | 435/6 |

FOREIGN PATENT DOCUMENTS

| 2624406 | 6/1989 | France | 427/157 |
|---|---|---|---|
| 59-20466 | 5/1984 | Japan | 427/157 |

*Primary Examiner*—Laurie K. Cranmer
*Attorney, Agent, or Firm*—Ridout & Maybee

[57] ABSTRACT

Identification device for distinctively marking objects, location or sides of symmetrical objects such as audio tape cassettes, so that they can be distinguished in the dark. A carrier lamina has a matt phosphorescent pigment coating exposed on one side so that indelible writing or other marks can be made thereon using a writing instrument. The dark writing or other marks are viewable in the dark in contrast against the glow of the unmarked phosphorescent pigment surface and will not smudge or erase when handled. The opposite side carries a permanently tacky pressure sensitive adhesive coating so that the phosphorescent lamina can be easily adhered on objects or locations to be marked.

17 Claims, 1 Drawing Sheet

PHOSPHORESCENT IDENTIFICATION DEVICE

This application is a continuation-in-part of U.S. patent application Ser. No. 705,810 filed May 28, 1991 now abandoned.

While there have been numerous proposals for phosphorescent sheets which may be applied to articles to enable the articles to be seen in the dark, none of the prior proposals of which the applicant is aware have enabled the user conveniently to make and apply instinctively marked phosphorescent identification devices. Such devices would allow the user to distinguish between differently marked locations or devices in the dark and so enable the user to, for example, make and apply markers which distinctively identify different locations or objects in the dark or which a low the user to distinguish between similarly sized and shaped articles in the dark, or between opposite faces of symmetrical articles, such as tape cassettes.

The invention provides an identification device comprising a carrier lamina having a matt phosphorescent pigment coating continuously and uniformly applied on one exposed side whereby a mark can be made on said exposed side with a writing instrument such as a pen, pencil, marker or the like. The opposite side of the lamina carries a permanently tacky adhesive coating which is protected by a peelable release backing.

In the dark, the coating provides a continuously extending glowing area. When the user writes or makes any other marking on the coating with a writing instrument which makes an opaque mark, the writing or other mark is viewable or readable in the dark by virtue of its dark contrast with the surrounding glowing area.

In the preferred form, the identification device is an indelibly markable identification device and the coating is permanently and indelibly ink receptive. That is to say, when an ink writing instrument is used to make a mark on the coating, the mark is indelible and permanent and cannot be removed by wiping, rubbing or by any means except by destroying the coating. Preferably, the coating is indelibly and permanently ink receptive even when marked with an ink of dry wipe erasable type such as for example a SANFORD EXPO (trade-mark) dry erase marker pen.

In one highly preferred form, the identification device is used to distinguish between the sides of the conventional audio magnetic tape cassettes having a plane of symmetry and two opposing major sides, so that, for example, road vehicle drivers can distinguish one cassette from another and one side of the cassette from the other, allowing selection of the recorded material at night or in other low illumination conditions without needing to turn on the interior lights which may impair the driver's night vision.

The invention will be described in more detail, by way of example only, with reference to the accompanying drawings wherein.

Figure 1:
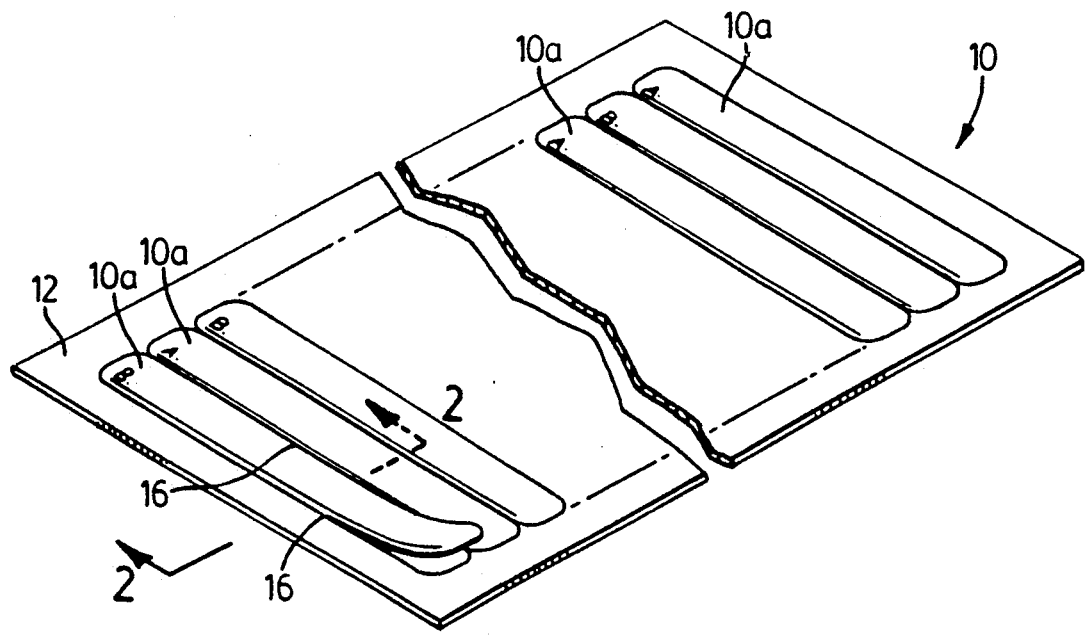
FIG. 1 is a perspective view of phosphorescent labelling material in accordance with the invention.
Figure 2:
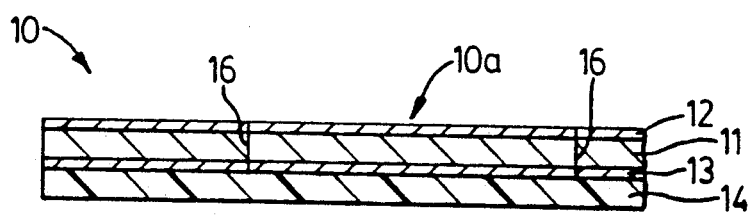
FIG. 2 is a partial cross-section along the line 2—2 in FIG. 1.
Figure 3:
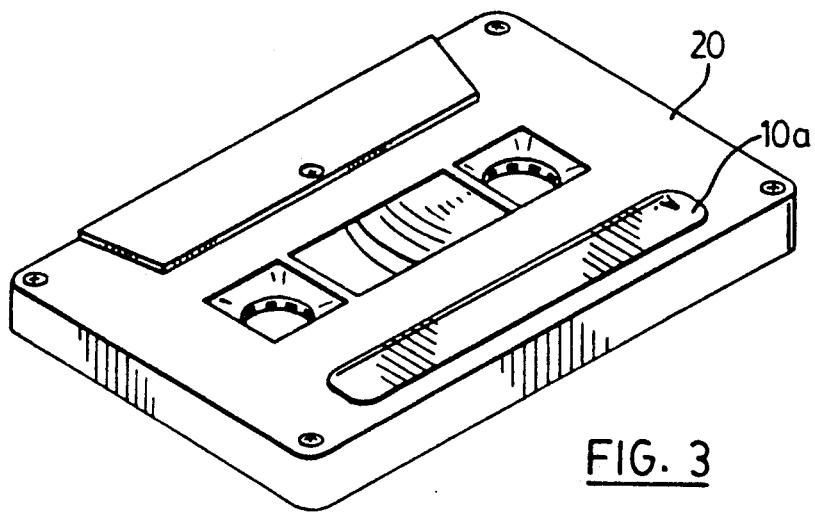
FIG. 3 is a perspective view of an audio cassette having a phosphorescent label applied.

Referring to FIGS. 1 and 2, labelling material 10 comprises in this example a rectangular sheet of a preferably flexible carrier lamina 11, for example paper, having on its upper side a coating 12 of a phosphorescent pigment which forms the upper exposed side of the material. The lower side of the lamina 11 carries a permanently tacky pressure sensitive adhesive coating 13 protected with a peelable release coated backing lamina 14, e.g. silicone treated paper.

The lamina 11 with its coatings is die cut and kiss cut by conventional die cutting and kiss cutting procedures along lines 16 through to the upper side of the backing 14, so that the latter remains as a continuous lamina from which individual labels 10a defined by the die cuts 16 may be peeled for application as identification devices. The permanently tacky coating 13 which is exposed allows easy application of the phosphorescent material to objects or locations to be marked for viewing in the dark.

Normally, before peeling off the individual label 10a but optionally after applying it to an object or location to be distinctively marked, the label 10 is written on or otherwise marked by the user with a dark marking writing instrument such as a pen, pencil or marker. Preferably, the writing instrument is a fine metal ball tipped writing instrument such as the kind available under the trade-mark PILOT from the Pilot Pen Company, Japan or under the trade-mark UNI-BALL from Faber-Castell Canada Inc., Toronto, Canada, by reason of their definite dark marking abilities. The marking may however, if desired, be made with an ink marker of the dry wipe erasable type such as the SANDFORD EXPO (trade-mark) dry erase marker pen. On smooth glossy surfaces such as plastic film, such inks can be removed by rubbing with a dry eraser such as cloth or paper tissue. On the matt permanently ink receptive phosphorescent pigment coating, however, the ink forms an indelible marking so that the marking will not be erased by handling by the user in the dark or under low light level conditions.

For example, in the case of labels to be applied to audio cassettes, the user will write on the labels the title of the cassette, or the name of the artist recorded, so as to distinguish the cassette from others in the dark, and may write information on the material recorded on each side of the cassette, as an aid to memory in the dark of the material recorded on each side, this writing being viewable in the dark by reason of the contrast between the dark ink lines and the glowing label background.

As a guide to the user the labels 10a may be printed with lines as shown, and in the case of labels to be applied to an audio cassette 20, with designations of A and B sides as shown.

The phosphorescent pigments which are used in the present invention are in themselves well known. The term "phosphorescent" is used in it conventional sense as meaning a pigment which when exposed to a stimulus such as daylight, or a component thereof such as ultra-violet radiation, absorbs such light or component and continues to emit visible light after the stimulus is removed. Preferably the phosphorescent pigments used have relatively long persistence values. Such persistence values are measured in terms of the time in minutes after removal of the stimulus for the light intensity measured in mcd/m$^2$ (milli Candles (Int.) per meter squared) to fall below 0.32 mcd/m$^2$, a value 100 times that of the threshold of perception. Preferably, the pigments used exhibit persistence (100 ×threshold of perception 0.32 mcd/m$^2$ in min.) of from about 100 min. to about 800 min., preferably about 240 min. to about 800 min. Typically, the pigments comprise mixtures of zinc, cadmium, strontium and calcium sulphides, optionally with metal activator ions such as copper, cobalt and bismuth. Examples of such pigments are those available under the trade-mark LUMILUX from Riedel de Haen AG of Seelze, West Germany.

In forming the present identification devices an ink or other coating composition comprising the phosphorescent pigments is preferably applied on a preassembled lamina comprising the adhesive backed paper or other lamina 11 provided with the protective release-coated lamina 14. Such pre-assembled laminae are commercially available for example under the trade-mark STRIP-TAC PLUS from Brown Bridge division of Kimberly-Clark Corporation, P.O. Box 370, Troy, Ohio 45373.

Such inks or other coating compositions normally comprise the phosphorescent pigment dispersed in a liquid medium forming on drying a binder matrix which binds the pigment to the surface of the lamina 11.

As noted above, it is important that the surface of the coating have a matt finish so that it will readily and permanently receive written indicia indelibly thereon and is conducive to the forming of definite dark writing or other marks thereon which are not smudged or erased in the hands of the user. Such matt finish is preferably perceptibly rough to the finger tip and takes up conventional water or solvent based dark ink to form continuous uninterrupted marks on drawing a pen such as the PILOT, UNI-BALL and SANDFORD EXPO pens mentioned above thereacross. Such matt surfaces may be obtained by appropriate formulation of the phosphorescent ink or other phosphorescent coating composition, by selection of appropriate coating or printing methods or by a combination of these two techniques.

Preferably, in order to provide a matt finish the ink or other coating composition comprises a high proportion of solid particles such that on drying the coating comprises about 50% to about 95% by weight, more preferably about 60% to about 75% by weight of solid particles based on the total dry weight of the coating including the particles and matrix binder. Preferably the solid particles are substantially wholly phosphorescent pigment particles but it is acceptable to use some inert non-phosphorescent diluent particles in the ink or other coating composition, for example inert pigment particles such as titanium dioxide and silica provided those do not adversely affect the brightness of the phosphorescent glow. Preferably the quantity of phosphorescent particles comprises about 50 to about 100% by weight of the solid particles in the ink or other coating composition, more preferably about 75 to about 100%.

A matt finish is also favoured by using particles which are of relatively large size. Preferably the average particle size is about 15 to about 45 microns as measured a Fisher Sub-Sieve Sizer, more preferably about 20 to about 40. Such Fisher Sub-Sieve Sizer micron particle sizes are measured using a conventional instrument obtained from Fisher Scientific Company, Unionville, Ontario, Canada, Catalogue Item No. 14-311.

Preferably, a matt finish is achieved by using a coating technique which tends to provide surface roughness. For example the coating may be applied by air brushing onto the lamina 11 or, more preferably, by screen printing. Moreover where the ink or other coating composition tends to form a suitable ink receptive matt finish regardless of the application method, other conventional application methods may be employed for example brushing on the composition or printing it on using standard rotary lithographic procedures, wherein for example the coating composition is doctored onto a rotating roller in a thin film using a doctor blade and transferred onto continuous stock passed in contact with and under the roller.

Although the above description provides ample information to enable one of ordinary skill in the art to carry out the invention, for the avoidance of doubt some detailed Examples will be given.

EXAMPLE 1

| Phosphorescent coating composition | |
| --- | --- |
| 2 parts | 10% aqueous solution of sodium hexametaphosphate |
| 5 parts | 10% aqueous sodium hydroxide solution |
| 17 parts | distilled water |
| 0.04 parts | Aerosil (fine silica) |
| 5 parts | denatured ethyl alcohol |
| 2 parts | butyl glycol acetate |
| 68.5 parts | MOWILITH DC 02 (trade-mark) (resin binder available from Hoechst Canada Inc.) |

100 parts of a mixture of the above composition is blended with 300 parts of LUMILUX pigment to obtain a coating composition suitable for application on paper stock.

Further examples of phosphorescent inks or coating compositions which may be employed include SPEEDBALL NIGHT GLO TEXTILE INKS (trade-mark) available from Hunt Manufacturing Co. of Statesville, N.C.

EXAMPLE 2

The structure shown in FIGS. 1 and 2 of the drawings was formed by screen printing on STRIP-TAC PLUS (trade-mark) self adhesive release backed stock. The ink used for the screen printing was SPEEDBALL NIGHT GLO TEXTILE INK. It was applied through a large mesh silk screen, 110 mesh size (openings per linear inch). After a first application, the ink was allowed to dry at 135° F. for 30 to 45 seconds and a second silk screen application was made as before. About 0.02 oz. of ink was deposited in each application. After drying of the second coating the lines and A and B markings shown in FIG. 1 were silk-screened on using a conventional black printing ink and a fine mesh silk screen of 305 mesh (305 openings per linear inch). After drying of the ink, the printed sheet was die cut and kiss cut. The matt phosphorescent coating formed on the sheet permanently and indelibly received a marking of ink when applied thereto. Such marking was indelible even when the ink was of a dry wipe marking erasable type (for example a SANFORD EXPO dry erase marker).

I claim:

1. An indelibly markable identification device comprising a carrier lamina having on one exposed side a matt phosphorescent pigment coating that is permanently and indelibly ink receptive, whereby an indelible mark can be made on said exposed side with an ink writing instrument, a pressure-sensitive permanently tacky adhesive coating on an opposite side of said carrier lamina, and a release backing, said opposite side adhering peelably on said release backing, wherein said ink is of a dry wipe marking erasable type.

2. Device as claimed in claim 1 wherein said lamina is die cut into a plurality of similar labels each separately peelable from the backing.

3. An indelibly markable identification device comprising a carrier lamina having on one exposed side a matt phosphorescent pigment coating that is permanently and indelibly ink receptive, whereby an indelible mark can be made on said exposed side with an ink writing instrument, a pressure-sensitive permanently tacky adhesive coating on an opposite side of said carrier lamina, and a release backing, said opposite side adhering peelably on said release backing, wherein said pigment coating is screen printed on the carrier lamina.

4. An indelibly markable identification device comprising a carrier lamina having on one exposed side a matt phosphorescent pigment coating that is permanently and indelibly ink receptive, whereby an indelible mark can be made on said exposed side with an ink writing instrument, a pressure-sensitive permanently tacky adhesive coating on an opposite side of said carrier lamina, and a release backing, said opposite side adhering peelably on said release backing, wherein said pigment coating comprises pigment particles having an average particle size about 15 to about 45 microns.

5. Device as claimed in claim 4 wherein said average particle size is about 20 to about 40 microns.

6. An indelibly markable identification device comprising a carrier lamina having on one exposed side a matt phosphorescent pigment coating that is permanently and indelibly ink receptive, whereby an indelible mark can be made on said exposed side with an ink writing instrument, a pressure-sensitive permanently tacky adhesive coating on an opposite side of said carrier lamina, and a release backing, said opposite side adhering peelably on said release backing, wherein said pigment coating comprises solid particles dispersed in a binder matrix and said particles comprise about 50% to about 95% by weight of the total weight of said particles plus matrix binder.

7. Device as claimed in claim 6 wherein said weight of particles is about 60% to about 75% of the total weight of said particles plus matrix binder.

8. Device as claimed in claim 6 wherein about 50% to about 100% by weight of said particles comprise phosphorescent pigment particles.

9. Device as claimed in claim 8 wherein said particles are about 75% to about 100% by weight phosphorescent particles.

10. An audio tape cassette having a plane of symmetry and two major sides each having applied thereon an indelibly markable identification device comprising a carrier lamina having a matt luminescent pigment coating continuously and uniformly applied on one exposed side, said coating being permanently and indelibly ink receptive whereby an indelible mark can be made on said exposed side with an ink writing instrument, and a pressure-sensitive permanently tacky adhesive coating on an opposite side adhering said identification device to said major side, wherein said ink is dry wipe marking erasable type ink.

11. An audio tape cassette having a plane of symmetry and two major sides each having applied thereon an indelibly markable identification device comprising a carrier lamina having a matt luminescent pigment coating continuously and uniformly applied on one exposed side, said coating being permanently and indelibly ink receptive, whereby an indelible mark can be made on said exposed side with an ink writing instrument, and a pressure-sensitive permanently tacky adhesive coating on an opposite side adhering said identification device to said major side, wherein said pigment coating is screen printed on the carrier lamina.

12. An audio tape cassette having a plane of symmetry and two major sides each having applied thereon an indelibly markable identification device comprising a carrier lamina having a matt luminescent pigment coating continuously and uniformly applied on one exposed side, said coating being permanently and indelibly ink receptive, whereby an indelible mark can be made on said exposed side with an ink writing instrument, and a pressure-sensitive permanently tacky adhesive coating on an opposite side adhering said identification device to said major side, wherein said pigment coating comprises pigment particles having an average particle size about 15 to about 45 microns.

13. Cassette as claimed in claim 12 wherein said average particle size is about 20 to about 40 microns.

14. An audio tape cassette having a plane of symmetry and two major sides each having applied thereon an indelibly markable identification device comprising a carrier lamina having a matt luminescent pigment coating continuously and uniformly applied on one exposed side, said coating being permanently and indelibly ink receptive, whereby an indelible mark can be made on said exposed side with an ink writing instrument, and a pressure-sensitive permanently tacky adhesive coating on an opposite side adhering said identification device to said major side, wherein said pigment coating comprises solid particles dispersed in a binder matrix and said particles comprise about 50% to about 95% by weight of the total weight of said particles plus matrix binder.

15. Cassette as claimed in claim 14 wherein said weight of particles is about 60% to about 75% of the total weight of said particles plus matrix binder.

16. Cassette as claimed in claim 14 wherein about 50% to about 100% by weight of said particles comprise phosphorescent pigment particles.

17. Cassette as claimed in claim 16 wherein said particles are about 75% to about 100% by weight phosphorescent particles.

* * * * *